United States Patent
Nakatani

(10) Patent No.: US 9,183,474 B2
(45) Date of Patent: Nov. 10, 2015

(54) IMAGE FORMING APPARATUS FOR ADJUSTING BOUNDARY DATA

(71) Applicant: RISO KAGAKU CORPORATION, Tokyo (JP)

(72) Inventor: Nobuya Nakatani, Ibaraki (JP)

(73) Assignee: Riso Kagaku Corporation (JP)

( * ) Notice: Subject to any disclaimer, the term of this patent is extended or adjusted under 35 U.S.C. 154(b) by 0 days.

(21) Appl. No.: 14/309,193

(22) Filed: Jun. 19, 2014

(65) Prior Publication Data

US 2015/0002859 A1 Jan. 1, 2015

(30) Foreign Application Priority Data

Jun. 28, 2013 (JP) ................................. 2013-137205

(51) Int. Cl.
| | |
|---|---|
| G06F 15/00 | (2006.01) |
| G06K 1/00 | (2006.01) |
| G06K 15/02 | (2006.01) |
| H04N 1/387 | (2006.01) |
| H04N 1/393 | (2006.01) |
| H04N 1/40 | (2006.01) |

(52) U.S. Cl.
CPC ........ *G06K 15/1843* (2013.01); *G06K 15/1878* (2013.01); *H04N 1/387* (2013.01); *H04N 1/3871* (2013.01); *H04N 1/393* (2013.01); *H04N 1/40068* (2013.01)

(58) Field of Classification Search
CPC .......... G06K 15/1843; G06K 15/1878; H04N 1/3871; H04N 1/3935; H04N 1/387
See application file for complete search history.

(56) References Cited

U.S. PATENT DOCUMENTS

2010/0067023 A1* 3/2010 Ito .................................. 358/1.2
2010/0165394 A1* 7/2010 Hyuga et al. ................. 358/1.15

FOREIGN PATENT DOCUMENTS

JP 2008-149640 A 7/2008

* cited by examiner

*Primary Examiner* — Benjamin O Dulaney

(74) *Attorney, Agent, or Firm* — Schwegman Lundberg & Woessner, P.A.

(57) ABSTRACT

An image-forming apparatus that generates print image data for a printing apparatus including a printing unit for each color, on which, as the printing unit, at least a low-resolution printing unit having a relatively low resolution and a high-resolution printing unit having a relatively high resolution are mounted, includes: a color conversion processing unit that converts colors of an original image into color data for the printing apparatus; a rasterizing unit that generates data about a shape corresponding to a resolution of the printing unit from the original image; and an adjustment processing unit that generates overwriting image data about an overwriting-side object by synthesizing the color data generated by the color conversion processing unit and the data relating to the shape generated by the rasterizing unit, and generates the print image data by performing an overwriting process of overwriting base image data with the overwriting image data.

2 Claims, 15 Drawing Sheets

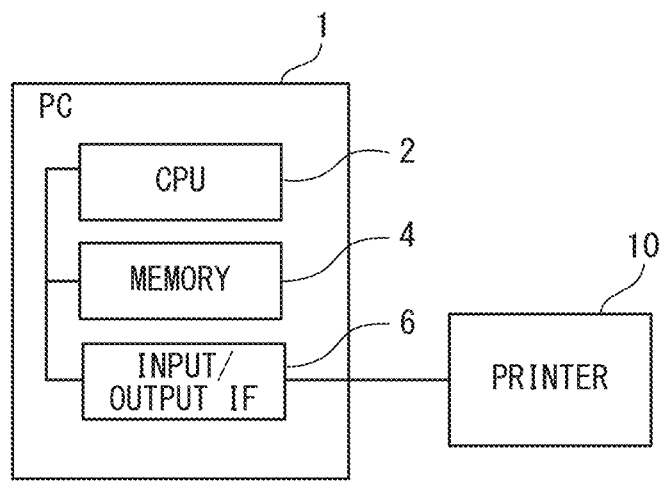
F I G. 1

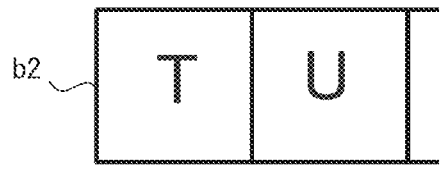
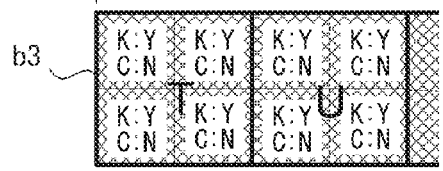

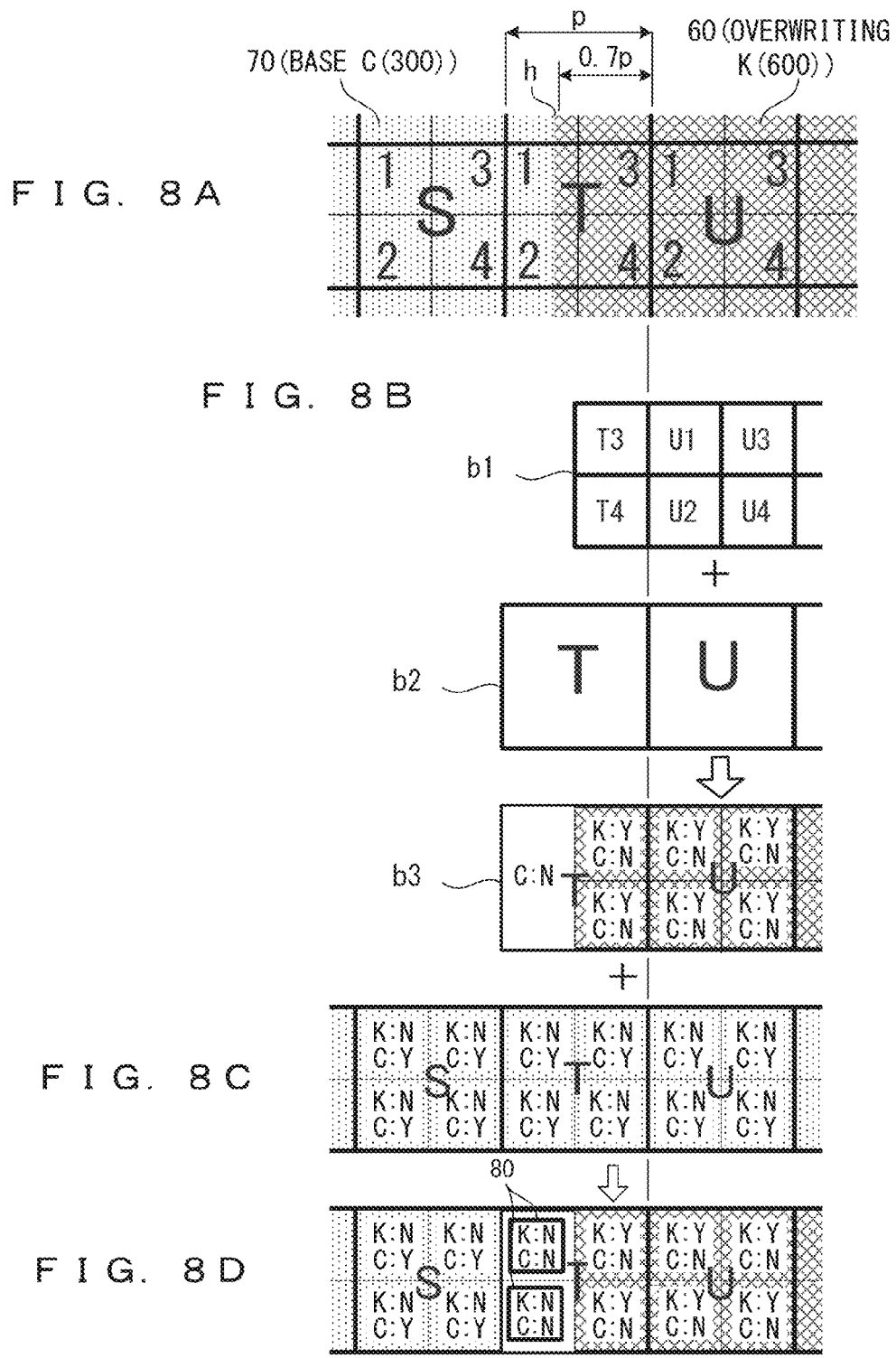

F I G. 9 A
F I G. 9 B
+
F I G. 9 C
F I G. 9 D

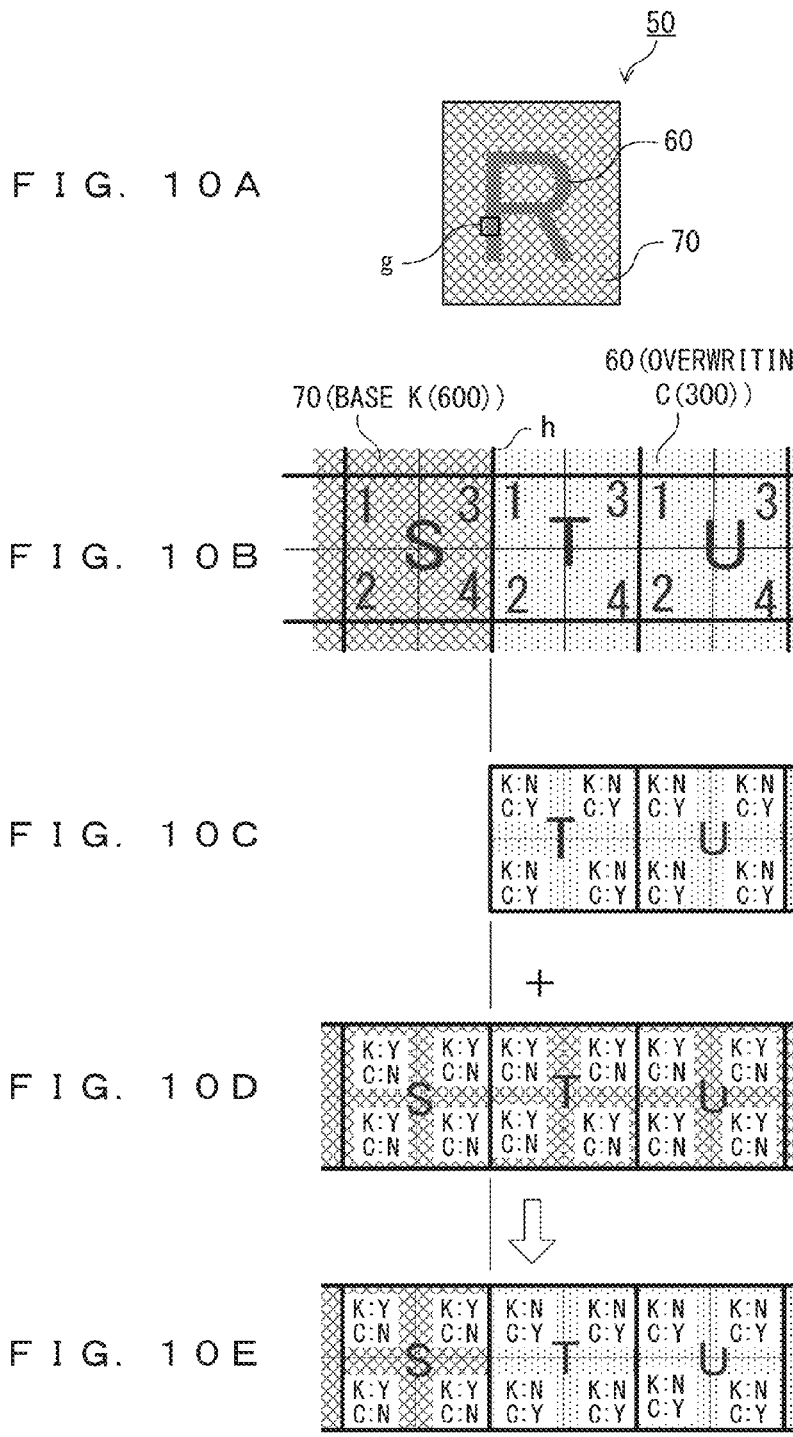

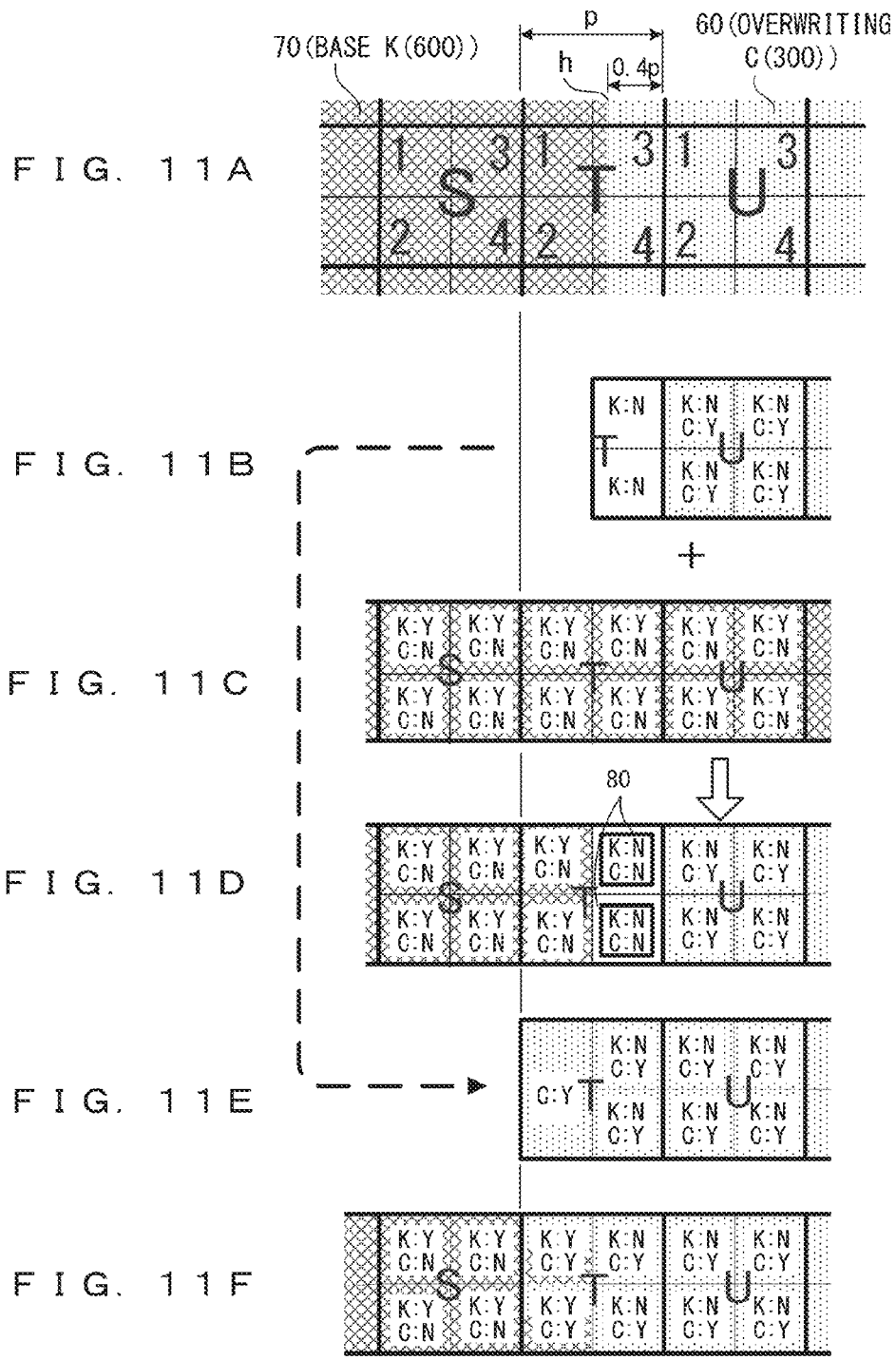

\+

⇩

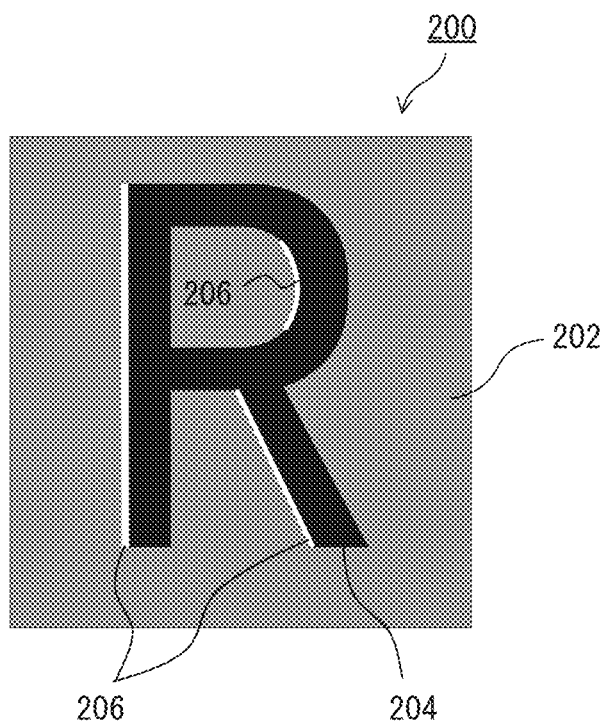
F I G. 15

IMAGE FORMING APPARATUS FOR ADJUSTING BOUNDARY DATA

CROSS REFERENCE TO RELATED APPLICATIONS

This application is based upon and claims the benefit of priority from the prior Japanese Patent Application No. 2013-137205, filed Jun. 28, 2013, the entire contents of which are incorporated herein by reference.

BACKGROUND OF THE INVENTION

1. Field of the Invention

The present invention is related to an image-forming apparatus that forms a print image for a printing apparatus on which print heads having different resolutions are mounted.

2. Description of the Related Art

In order to obtain a high-quality print image, a resolution of a printing unit has been enhanced. In some cases, from among printing units mounted on a printing apparatus, printing units for all colors are not configured to be high-resolution printing units, but only printing units for specified colors are configured to be high-resolution printing units and printing units for the other colors are configured to be normal-resolution printing units. This is because it is sometimes more appropriate to configure only the printing units for the specified colors to be high-resolution printing units due to apparatus costs or printing speed.

As a technique related to a printing apparatus on which printing units having different resolutions are mounted, for example, a printing apparatus that reads resolution information from a printing unit and performs a printing process corresponding to the read resolution is proposed (Japanese Laid-open Patent Publication No. 2008-149640).

SUMMARY OF THE INVENTION

When printing is performed using a printing apparatus on which printing units having different resolutions are mounted, an unprinted portion is sometimes generated at a boundary portion between colors corresponding to the printing units having different resolutions. FIG. 15 schematically illustrates an example in which the unprinted portion is generated. In this example, assume that a print image 200 is an image formed of a base side 202 that is a background of the entirety of the image, and an overwriting side 204 that is in the shape of the letter "R". Assume that the base side 202 is printed by a normal-resolution printing unit with a color corresponding to the normal-resolution printing unit, and that the overwriting side 204 is printed by the normal-resolution printing unit with a color corresponding to a high-resolution printing unit. On this occasion, an unprinted portion (void) 206 is sometimes generated at a boundary portion.

In view of the problem above, the present invention aims at providing an image-forming apparatus that outputs a print image in which an unprinted portion is not generated at a boundary between different resolutions for a printing apparatus on which printing units having different resolutions are mounted.

In order to achieve the object above, an image-forming apparatus that generates print image data for a printing apparatus in which a printing unit is provided for each color, and on which, as the printing unit, at least a low-resolution printing unit having a relatively low resolution and a high-resolution printing unit having a relatively high resolution are mounted, includes: a color conversion processing unit that converts colors of an original image into color data for the printing apparatus; a rasterizing unit that generates data relating to a shape corresponding to a resolution of the printing unit from the original image; and an adjustment processing unit that generates overwriting image data relating to an overwriting-side object by synthesizing the color data generated by the color conversion processing unit and the data relating to the shape generated by the rasterizing unit, and generates the print image data by performing an overwriting process of overwriting base image data with the overwriting image data, and, when, in the overwriting image data, low-resolution component data corresponding to the low-resolution printing unit includes a larger portion than high-resolution component data corresponding to the high-resolution printing unit within a boundary portion between the low-resolution component data and the high-resolution component data, and a void instruction is issued to the larger portion within the boundary portion, the adjustment processing unit deletes the low-resolution component data corresponding to the larger portion within the boundary portion, and performs the overwriting process.

The image-forming apparatus described above enables preventing a void at a boundary by performing a simple process of adjusting overwriting-side object data.

BRIEF DESCRIPTION OF THE DRAWINGS

FIG. 1 illustrates a printer 10 connected to a PC 1 to which an image-forming apparatus according to the embodiments is applied.

FIG. 6A illustrates overwriting-side object data in a case in which the boundaries coincide with each other in the first combination.

FIG. 6B illustrates base-side object data in a case in which the boundaries coincide with each other in the first combination.

FIG. 6C illustrates synthetic object data in a case in which boundaries coincide with each other in a first combination.

FIG. 8A is an enlarged view of graphic data in the first combination.

FIG. 8B illustrates the generation of overwriting-side object data in a case in which an adjustment process is not performed in the first combination.

FIG. 8C illustrates base-side object data in the first combination.

FIG. 8D illustrates synthetic object data in a case in which the adjustment process is not performed in the first combination.

FIG. 9A illustrates overwriting-side object data before the adjustment process in the first combination.

FIG. 9B illustrates overwriting-side object data after the adjustment process in the first combination.

FIG. 9C illustrates base-side object data in the first combination.

FIG. 9D illustrates synthetic object data in the first combination.

FIG. 10A illustrates an example of a printed original image in a third combination.

FIG. 10B is an enlarged view of graphic data in the third combination.

FIG. 10C illustrates overwriting-side object data in the third combination.

FIG. 10D illustrates base-side object data in the third combination.

FIG. 10E illustrates synthetic object data in the third combination.

FIG. 11A is an enlarged view of graphic data in a case in which boundaries do not coincide with each other in the third combination (first example).

FIG. 11B illustrates overwriting-side object data in a case in which the boundaries do not coincide with each other in the third combination (first example).

FIG. 11C illustrates base-side object data in a case in which the boundaries do not coincide with each other in the third combination (first example).

FIG. 11D illustrates synthetic object data in a case in which the boundaries do not coincide with each other in the third combination (first example).

FIG. 11E illustrates overwriting-side object data after an adjustment process in a case in which boundaries do not coincide with each other in the third combination (first example).

FIG. 11F illustrates synthetic object data after an adjustment process in a case in which the boundaries do not coincide with each other in the third combination (first example).

FIG. 15 schematically illustrates an example in which an unprinted portion is generated.

20

DETAILED DESCRIPTION OF THE PREFERRED EMBODIMENTS

Described below are the embodiments of the present invention with reference to the drawings. FIG. 1 illustrates a PC 1 (personal computer) to which an image-forming apparatus according to the embodiments is applied, and a printer 10 that is connected to the PC 1 and prints a color image. The PC 1 generates and outputs print image data for the connected printer 10 from an original, a captured image, a graphic image, or the like (also collectively referred to as an original image). The printer 10 conveys paper, drives internal print heads and the like, and performs printing on the basis of the print image data output from the PC 1.

The PC 1 includes a CPU 2, a memory 4, and an input/output IF 6. The CPU 2 reads a program, and performs each process in accordance with the read program. In addition, in the embodiments, the CPU 2 performs an image forming process of forming a print image from the original or an image, and generates print image data. The memory 4 is composed of a memory that stores various programs or pieces of data in a non-volatile manner (e.g., a hard disk) and a temporary storage unit that is a working area (e.g., a DRAM).

The input/output IF 6 is an interface that controls data communication between the PC 1 and an external device connected to the PC 1. The input/output IF 6 is, for example, a USB or a LAN.

Figure 2:
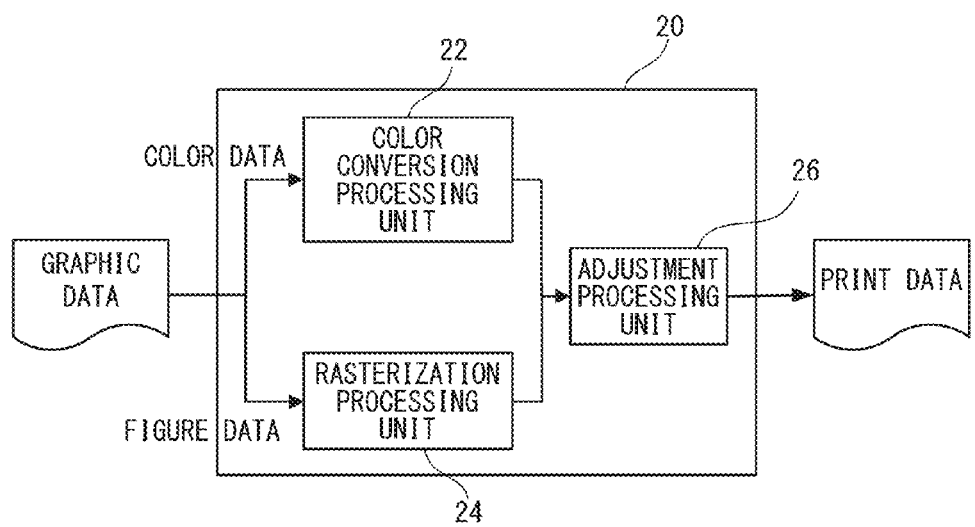
FIG. 2 is a functional block diagram explaining an image forming process.

FIG. 2 is a functional block diagram explaining an image forming process performed by the CPU 2. The CPU 2 reads a program from the memory 4, and performs an image forming process in accordance with a read prescribed program. The image forming process performed by the CPU 2 is described below as a process performed by an image forming unit 20.

The image forming unit 20 forms print data corresponding to the connected printer 10 from graphic data that is generated by the PC 1 or is input into the PC 1. The image forming unit 20 includes a color converting unit 22, a rasterization processing unit 24, and an adjustment processing unit 26. The image forming unit 20 is also referred to as an image-forming apparatus, and the adjustment processing unit 26 is also referred to as an adjustment processing apparatus.

The color converting unit 22 performs a process of color-converting color data of an original image into gradation data of device color components (colors corresponding to a plurality of printing units used by the printer 10). For example, gradation data of each pixel that constitutes RGB data that is general image data is made to be a conversion object, and while object pixels are sequentially changed, a LUT (color conversion table) is referred to, and image data formed of RGB is color-converted into image data of 256 gradations (an integer value of 0-255) corresponding to each of the CMYK inks.

The rasterization processing unit 24 fetches figure data indicating a shape from data of the original image, and draws raster data.

The adjustment processing unit 26 synthesizes the image data color-converted by the color converting unit 22 and the raster data drawn by the rasterization processing unit 24, generates print data, and outputs the print data.

In order to not generate an unprinted portion (void) within a boundary portion between colors having different resolutions in forming print data for the printer 10 on which printing units having different resolutions are mounted, the adjustment processing unit 26 further adjusts the boundary portion of the drawn print data on the basis of pieces of resolution data of the printing units corresponding to respective colors in the printer 10. An adjustment process performed by the adjustment processing unit 26 is described below in detail.

Figure 3:
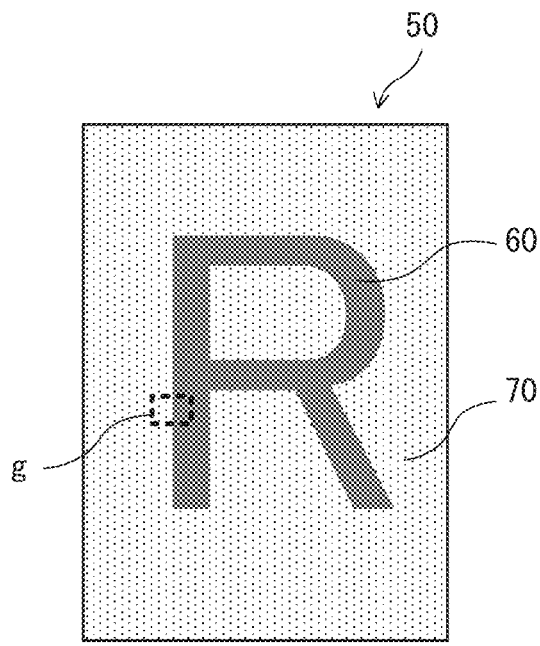
FIG. 3 illustrates an example of a printed image.

FIG. 3 illustrates an example of a printed image. As illustrated in FIG. 3, as an example of an original image 50 of graphic data, an image is taken in which the letter "R" as an overwriting image 60 that is a subject overlaps a base image

70 that is a background. Described below is an adjustment process performed in a portion g that is a portion of a boundary between the overwriting image (overwriting-side object) 60 and the base image (base-side object) 70.

Assume that the printer 10 is an ink-jet type printer including printing units of four colors of CMYK (hereinafter referred to as "print heads"). Assume that the overwriting image 60 and the base image 70 are printed with different colors, for example, a combination of black (K) and cyan (C). Also assume that print heads of black (K) and cyan (C) have different resolutions, and that one of the print heads has a low resolution and the other has a high resolution. This makes 4 combinations, i.e., first to fourth combinations. Adjustment processes performed by the adjustment processing unit 26 in the respective combinations are sequentially described below. A case is taken as an example in which the low resolution is 300 DPI and the high resolution is 600 DPI.

<First Combination>

FIG. 4A to FIG. 9D illustrate an adjustment process that prevents a void in the first combination. In the first combination, the overwriting image 60 has a high resolution (600 DPI), and is colored in black (K). Stated another way, the base image 70 has a low resolution (300 DPI), and is colored in cyan (C).

Figure 4A:
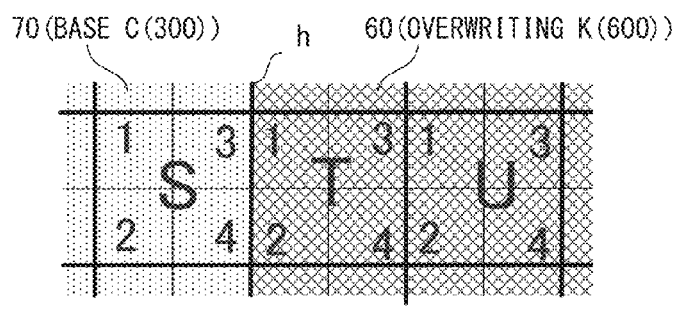
FIG. 4A is an enlarged view of graphic data in a case in which boundaries coincide with each other in a first combination.
Figure 4B:
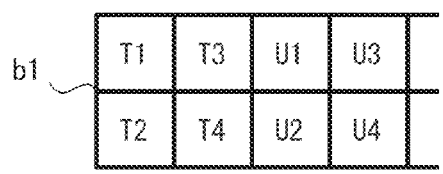
FIG. 4B illustrates the generation of overwriting-side object data in a case in which the boundaries coincide with each other in the first combination.

FIG. 4A and FIG. 4B illustrate dot data (also referred to as "bit map data") of the overwriting-side object in a case in which boundaries coincide with each other in the first combination. A case in which the boundaries coincide with each other means a case in which a boundary h between the overwriting image 60 and the base image 70 coincides with a boundary between dots of the high resolution and dots of the low resolution.

FIG. 4A is an enlarged view of graphic data, and is a diagram in which the portion g of the original image 50 is enlarged. In FIG. 4A, dot data of the original image 50 is mapped. The graphic data is divided into dot data in units of the low resolution (300 DPI) (low-resolution component data) and dot data in units of the high resolution (600 DPI) (high-resolution component data), and is processed by the color converting unit 22 and the rasterization processing unit 24.

A smallest thin-line frame is one dot of a high-resolution component. A thick-line frame formed of four thin-line frames is one dot of a low-resolution component. Each of the dots of the low-resolution component is expressed by S, T, or U, and one dot of the high-resolution component included in the dot of the low-resolution component is expressed by the numeral 1, 2, 3, or 4 in accordance with its position. For example, high-resolution dots included in a low-resolution dot T are respectively referred to as T1, T2, T3, and T4.

An area illustrated by crossed oblique lines on a right-hand side of FIG. 4A (dot T and dot U) is an area of the overwriting image 60 colored in black (K). An area illustrated by small dots on a left-hand side of FIG. 4A (dot S) is an area of the base image 70 colored in cyan (C). Hereinafter, a black (K) area is illustrated by crossed oblique lines, and a cyan (C) area is illustrated by small dots. The boundary h between the images coincides with a boundary (border) between the dot S and the dot T.

FIG. 4B illustrates the generation of overwriting-side object data. Hereinafter, dot data of the overwriting-side object is referred to as "overwriting-side object data", and dot data of the base-side object is referred to as "base-side object data".

In addition, the overwriting-side object data and the base-side object data are respectively formed of object data of a 600-DPI component (hereinafter sometimes abbreviated as "600 DPI"; corresponding to black (K) in this example) and object data of a 300-DPI component (hereinafter sometimes abbreviated as "300 DPI"; corresponding to cyan (C) in this example).

On the basis of the graphic data in FIG. 4A, the overwriting-side object data is generated. b1 in FIG. 4B is overwriting-side object data of 600 DPI. In a rightward direction from the dot T1 and the dot T2, object data of 600 DPI is generated. b2 in FIG. 4B is overwriting-side object data of 300 DPI. In a rightward direction from the dot T, object data of 300 DPI is generated. b1 and b2 in FIG. 4B are generated by the rasterization processing unit 24, and b1 and b2 in FIG. 4B merely include data on a shape of graphic data, but do not include information on color.

b3 in FIG. 4B illustrates overwriting-side object data that is generated by setting color information generated by the color converting unit 22 in the overwriting-side object data of 600 DPI and the overwriting-side object data of 300 DPI on the shape. The color information in the overwriting-side object data merely includes black (K), but does not include cyan (C).

In the dots T1-T4, the dots U1-U4, and the like, of 600 DPI corresponding to black (K), data "black (K):color present (Y)" is set. In addition, in the dot T and the dot U of 300 DPI corresponding to cyan (C), data "cyan (C):no color (N)" is set. By overlapping these pieces of data, overwriting-side object data (600+300) in which the color information has been set is generated.

As the overwriting-side object data (600+300) in which the color information has been set, data as indicated in b3 in FIG. 4B is generated. The data "black (K):color present (Y)" is set in each dot of 600 DPI, such as the dots T1-T4, and the data "cyan (C):no color (N)" is set in each dot of 300 DPI.

Figure 5A:
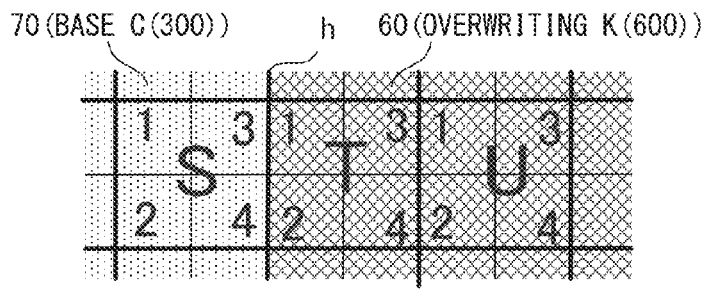
FIG. 5A is an enlarged view of graphic data in a case in which the boundaries coincide with each other in the first combination.
Figure 5B:
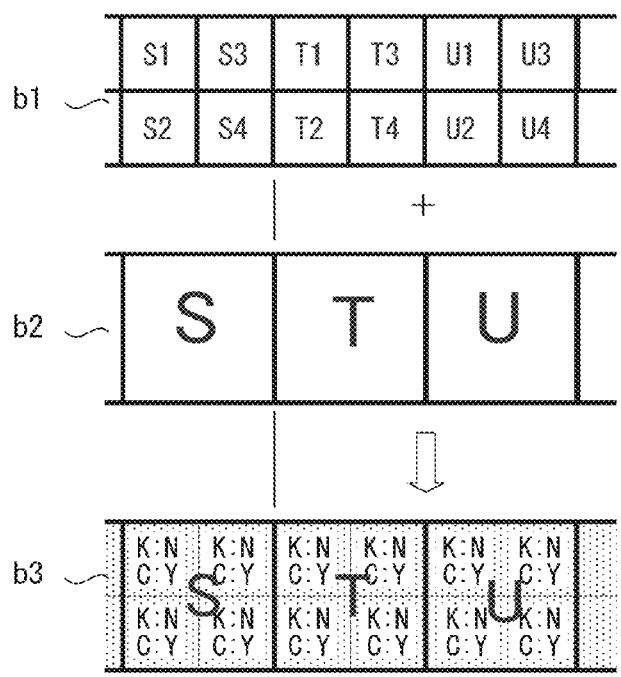
FIG. 5B illustrates the generation of base-side object data in a case in which the boundaries coincide with each other in the first combination.

FIG. 5A and FIG. 5B illustrate base-side object data in a case in which the boundaries coincide with each other in the first combination. The base-side object data is data that is generated by setting the color information generated by the color converting unit 22 in base-side object data of 600 DPI and base-side object data of 300 DPI relating to shape. FIG. 5A is an enlarged view of graphic data, and is the same as the enlarged view of graphic data of FIG. 4A.

On the basis of the graphic data in the enlarged view of graphic data, the base-side object data is generated. FIG. 5B illustrates the generation of the base-side object data. A base image 70 includes the entirety of the graphic data, and includes all of the dots S, T, and U, regardless of a position of a boundary. b1 of FIG. 5B illustrates generated base-side object data of 600 DPI, and includes all dots, such as dots S1-S4. b2 of FIG. 5B illustrates generated base-side object data of 300 DPI, and similarly includes all dots, such as dots S or T.

b3 of FIG. 5B illustrates base-side object data that is generated by setting the color information generated by the color converting unit 22 in data (600 DPI+300 DPI) relating to the shape of the base-side object data. The color information of the base-side object data merely includes cyan (C), but does not include black (K), and therefore the information "cyan (C):color present (Y)" is set in each of the dots of 300 DPI corresponding to cyan (C). In addition, in each of the dots of 600 DPI corresponding to black (K), the information "black (K):no color (N)" is set.

Figures 6A, 6B, 6C:
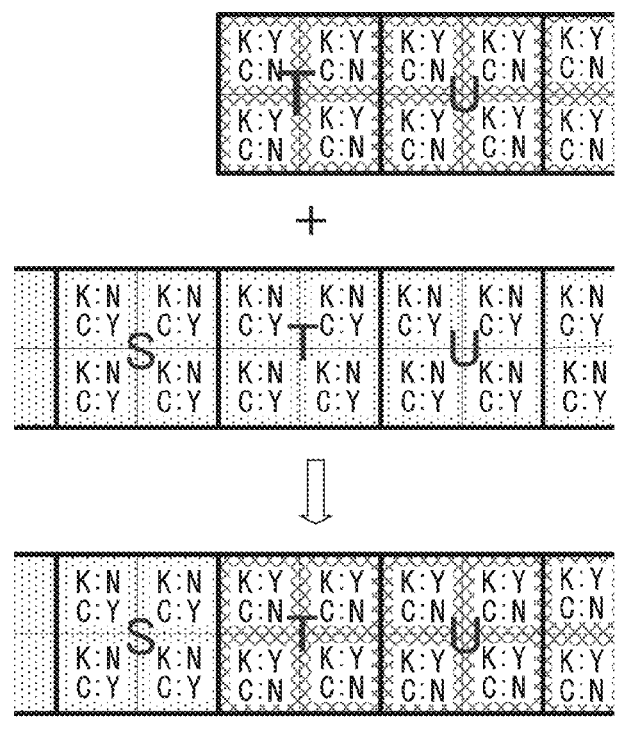

FIG. 6A-FIG. 6C illustrate a process of forming synthetic object data in a case in which the boundaries coincide with each other in the first combination. The synthetic object data is generated by synthesizing the overwriting-side object data with the base-side object data. FIG. 6A illustrates the overwriting-side object data, and is the same as b3 of FIG. 4B.

FIG. 6B illustrates the base-side object data (600 DPI+300 DPI) relating to the shape, and is the same as b3 of FIG. 5B.

FIG. 6C illustrates synthetic object data. The synthetic object data is generated so as to prioritize the overwriting-side object data in an area in which the overwriting-side object data and the base-side object data are overlapping. Accordingly, in the dot T and the dot U in which the overwriting-side object data and the base-side object data are overlapping, the overwriting-side object data is prioritized.

For example, in the dots T1-T4 and the dots U1-U4 (600 DPI), "black (K):color present (Y)" has been set in the overwriting-side object data, and "black (K):no color (N)" has been set in the base-side object data; however, "black (K):color present (Y)" is set because the overwriting-side object data is prioritized. In addition, in the dot T and the dot U (300 DPI), "cyan (C):no color (N)" has been set in the overwriting-side object data, and "cyan (C):color present (Y)" has been set in the base-side object data; however, "cyan (C):no color (N)" is set because the overwriting-side object data is prioritized. In the dot S, there is no overwriting-side object data, and therefore the base-side object data is applied as it is.

As described above, the synthetic object data is generated. The generated synthetic object data is output to the printer 10 as print data. As illustrated in FIG. 6C, when the boundaries coincide with each other in the first combination, there are no dots that have no color near the boundaries, and therefore a normal image without any voids is printed.

FIG. 7A-FIG. 7D illustrate a process of forming synthetic object data in a case in which the boundaries do not coincide with each other in the first combination (first example). A boundary h of graphic data does not always coincide with a boundary (border) between dots.

Figure 7A:
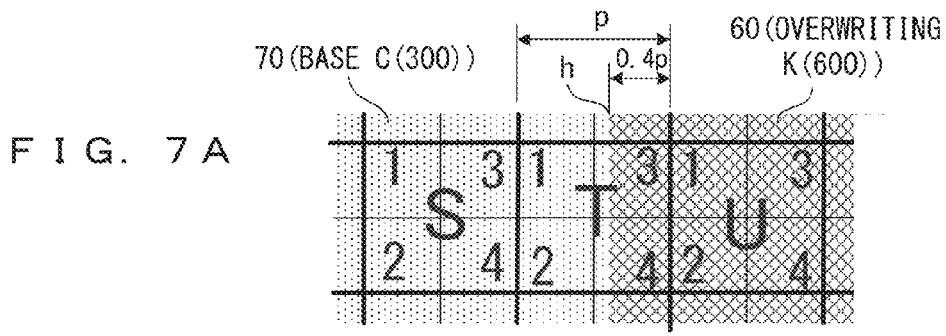
FIG. 7A is an enlarged view of graphic data in a case in which the boundaries do not coincide with each other in the first combination (first example).

FIG. 7A is an enlarged view of graphic data, and is a drawing in which the portion g of the original image 50 is enlarged. Here, as the first example of the case in which the boundaries do not coincide with each other, assume that one dot of 300 DPI has a pitch p, and that a boundary h between images (objects) deviates from a boundary between dots by 0.4 p. When the boundary between images exists in a dot, an image (color) that occupies 50% or more of a dot area is considered to be an image (color) in the dot. Accordingly, a case in which the boundary h deviates from the boundary between dots by 0.25 p or less or 0.75 p or more is considered to be the same as "a case in which the boundaries coincide with each other" as described above with reference to FIG. 6A-FIG. 6C.

Figure 7B:
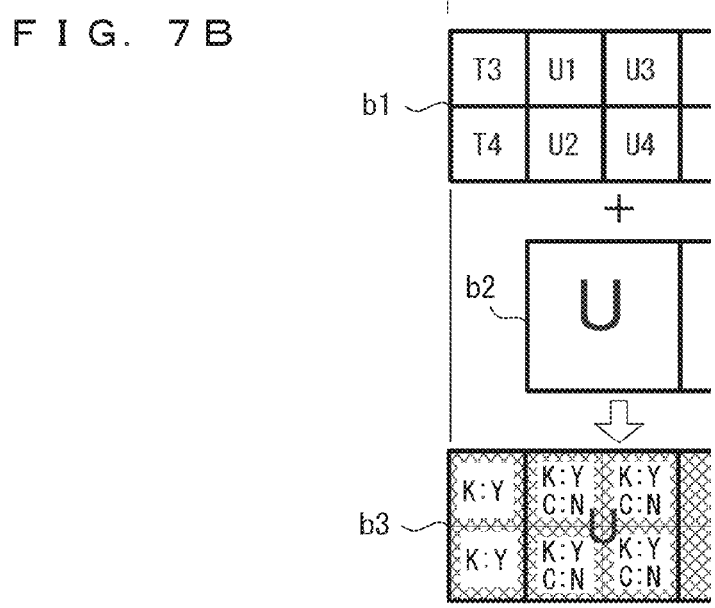
FIG. 7B illustrates the generation of overwriting-side object data in a case in which the boundaries do not coincide with each other in the first combination (first example).

FIG. 7B illustrates the generation of overwriting-side object data. b1 of FIG. 7B illustrates overwriting-side object data of 600 DPI. In this example, because a deviation of the boundary h is 0.4 p, 80% of the dots T3 and T4 of 600 DPI are included in an overwriting area. Accordingly, the dots T3 and T4 are considered to be included in an overwriting-side object. As a result, as illustrated in b1 of FIG. 7B, the overwriting-side object data of 600 DPI is generated so as to include an area in a rightward direction from the dots T3 and T4.

In the dot T of 300 DPI, the overwriting area is 50% or less of the dot T because the deviation of the boundary h is 0.4 p. Therefore, the dot T is considered to not be included in the overwriting-side object data. b2 of FIG. 7B illustrates overwriting-side object data of 300 DPI. Accordingly, as illustrated in b2 of FIG. 7, the overwriting-side object data of 300 DPI is generated so as to include an area in a rightward direction from the dot U.

b3 of FIG. 7B illustrates overwriting-side object data in which color information has been set. The data is overwriting-side object data that is generated by setting the color information generated by the color converting unit 22 in data (600 DPI+300 DPI) relating to a shape of the overwriting-side object data. The dots T3 and T4 merely include pieces of data of 600 DPI, and therefore the color information of the dots T3 and T4 is merely "black (K):color present (Y)", but does not include data on cyan (C).

Figure 7C:
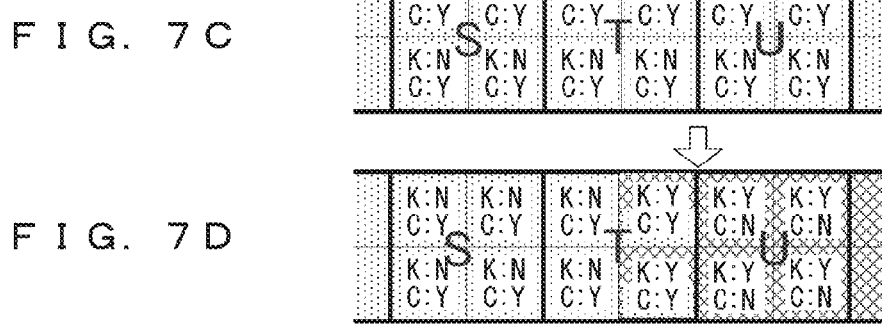
FIG. 7C illustrates base-side object data in a case in which the boundaries do not coincide with each other in the first combination (first example).

FIG. 7C illustrates base-side object data in which color information has been set. The base-side object data is the entirety of the original image, and is not influenced by a position of the boundary h. Therefore, the base-side object data illustrated in FIG. 7C is the same as the data illustrated in FIG. 6B.

Figure 7D:
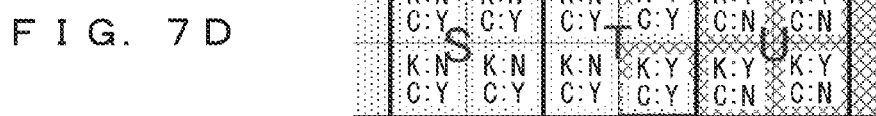
FIG. 7D illustrates synthetic object data in a case in which the boundaries do not coincide with each other in the first combination (first example).

FIG. 7D illustrates synthetic object data. As described above, the synthetic object data is generated so as to prioritize overwriting-side object data in an area in which the overwriting-side object data and the base-side object data are overlapping. Accordingly, in the generated synthetic object data, an area in a rightward direction from the generated dots T3 and T4 is set to "black (K):color present (Y)" of 600 DPI.

In addition, with respect to cyan (C) of 300 DPI in the overwriting-side object data, "cyan (C):no color (N)" is set in an area in a rightward direction from the dot U, and the dot T does not include color information on cyan (C). Namely, because the dot T (300 DPI) of the overwriting-side object data does not include information on cyan (C), in the dot T, "cyan (C):color present (Y)" of the base-side object data is set. Namely, in the dots T3 and T4, data in which cyan (C) and black (K) are redundantly set is generated. As a result, also in the first example in which the boundaries do not coincide with each other in the first combination, an image without any voids within the boundary portion is printed. Namely, no voids occur within the boundary portion.

FIG. 8A-FIG. 8D and FIG. 9A-FIG. 9D illustrate a process of forming synthetic object data in a case in which the boundaries do not coincide with each other in the first combination (second example). The second example is a case in which a color boundary h deviates by 0.7 p. FIG. 8A to FIG. 8D illustrate a process of forming synthetic object data in a case in which an adjustment process is not performed, and in this process, a void occurs within the boundary portion.

FIG. 8A is an enlarged view of graphic data, and is a diagram in which the portion g of the original image 50 is enlarged. As illustrated, the boundary h between images (objects) deviates from a boundary between dots by 0.7 p.

FIG. 8B is a diagram explaining the generation of overwriting-side object data. b1 of FIG. 8B illustrates overwriting-side object data of 600 DPI.

In this example, because the boundary h deviates from the boundary between dots by 0.7 p, only 40% of the dots T1 and T2 of 600 DPI are included in an overwriting area. Accordingly, the dots T1 and T2 are not included in overwriting-side object data. As a result, as illustrated in b1 of FIG. 8B, overwriting object data of 600 DPI is generated so as to include an area in a rightward direction from the dots T3 and T4.

In contrast, because 70% of the dot T of 300 DPI is the overwriting area, the dot T of 300 DPI is included in the overwriting-side object data. b2 of FIG. 8B illustrates overwriting-side object data of 300 DPI. Accordingly, as illustrated in b2 of FIG. 8B, the overwriting-side object data of 300 DPI is generated so as to include an area in a rightward direction from the dot T.

b3 of FIG. 8B illustrates overwriting-side object data in which color information has been set in data (600 DPI+300 DPI) on a shape of the overwriting-side object data. In the dot T of 300 DPI, the color information "cyan (C):no color (N)" is set. Information indicating that there is no color at the boundary portion, such as "cyan (C):no color (N)", is also referred to as a "void instruction".

FIG. 8C illustrates base-side object data in which the color information has been set. The base-side object data is not influenced by a position of the boundary h, and therefore the base-side object data illustrated in FIG. 8C is the same as the data illustrated in FIG. 7C.

FIG. 8D illustrates synthetic object data. As described above, the synthetic object data is generated so as to prioritize the overwriting-side object data. In the dot T, "cyan (C):no color (N)" of the overwriting-side object data is prioritized, and data of cyan of the base-side object data is cancelled, and therefore the information "cyan (C):no color (N)" is set in the dot T of the synthetic object data. Namely, the information "black (K):no color (N); cyan (C):no color (N)" is set in a left-half portion of the dot T (dots T1 and T2), and the dots T1 and T2 become colorless dots 80. "black (K):color present (Y); cyan (C):no color (N)" is set in a right-half portion of the dot T (dots T3 and T4). When printing is performed on the basis of the synthetic object data, a void having a width of 0.5 p occurs longitudinally at the boundary portion.

FIG. 9A to FIG. 9D illustrate a process of performing an adjustment process and forming synthetic object data. In order to not generate the void as illustrated in FIG. 8A to FIG. 8D, an adjustment process of compensating for the color information at the boundary portion is performed by the adjustment processing unit 26.

FIG. 9A illustrates the overwriting-side object data illustrated in b3 of FIG. 8B. In the example illustrated in FIG. 8A to FIG. 8D, "cyan (C):color present (Y)" in the dot T of the base-side object data is cancelled by the information "cyan (C):no color (N)" (void instruction) set in the dot T of 300 DPI of the overwriting-side object data. In view of this, an adjustment process of deleting the information "cyan (C):no color (N)" set in the dot T from the overwriting-side object data is performed.

FIG. 9B illustrates overwriting-side object data generated by deleting the information "cyan (C):no color (N)" from the dot T in the adjustment process. FIG. 9C illustrates the base-side object data as illustrated in FIG. 8C. FIG. 9D illustrates synthetic object data using the overwriting-side object data on which the adjustment process has been performed. Because the data on cyan in the dot T of the base-side object data is not cancelled, an image without any voids at the boundary portion is printed. As a result, the same synthetic object data as the data illustrated in FIG. 7D is generated.

The process above enables preventing a void with few changes in size in an overwriting-side object by performing a simple process of adjusting the overwriting-side object data. In addition, a deletion amount of low-resolution data for preventing a void may be 1 dot or more.

In other words, this adjustment process is a process in which "when, in overwriting image data, low-resolution component data corresponding to a low-resolution printing unit makes up a larger portion of a boundary portion between the low-resolution component data and high-resolution component data corresponding to a high-resolution printing unit than does the high-resolution component data, and a void instruction is issued to the larger portion within the boundary portion, the low-resolution component data corresponding to the larger portion within the boundary portion is deleted, and an overwriting process is performed".

<Second Combination>

A second combination is a case in which the overwriting image 60 is cyan (C) of a high resolution (600 DPI) and the base image 70 is black (K) of a low resolution (300 DPI). The second combination is a combination generated by exchanging colors in the first combination with each other (K↔C). Accordingly, an adjustment process performed in order to prevent a void in the second combination is the same as the adjustment process for the first combination as described above, and the description is omitted.

<Third Combination>

FIG. 10A to FIG. 12D is a diagram explaining an adjustment process of preventing a void in a third combination. The third combination is a case in which a base image 70 is black (K) of a high resolution (600 DPI) and an overwriting image 60 is cyan (C) of a low resolution (300 DPI).

FIG. 10A to FIG. 10D illustrate a process of forming synthetic object data in a case in which the boundaries coincide with each other in the third combination. The process is similar to the process described above in the first combination (FIG. 4A to FIG. 6C), and is described simply below. FIG. 10A illustrates an example of a printed image, and the printed image is an image in which the letter "R" as the overwriting image 60 (cyan) that is a subject is overlapping the base image 70 (black), as an original image 50 of graphic data.

FIG. 10B is an enlarged view of graphic data, and is a diagram in which a portion g of the original image 50 is enlarged. FIG. 10C illustrates overwriting-side object data (600 DPI+300 DPI). FIG. 10D illustrates base-side object data (600 DPI+300 DPI). FIG. 10E illustrates synthetic object data based on the overwriting-side object data and the base-side object data. Similarly to the first and second combinations, when boundaries coincide with each other, no voids occur.

FIG. 11A to FIG. 11F illustrate a process of forming the synthetic object data in a case in which the boundaries do not coincide with each other in the third combination (first example). As illustrated in the enlarged view of graphic data of FIG. 11A, a boundary h between images deviates from a boundary between dots by 0.4 p.

FIG. 11B illustrates overwriting-side object data (600 DPI+300 DPI). As an area of 600 DPI of an overwriting-side object, an area in a rightward direction from the dots T3 and T4 is set to "black (K):no color (N)" (void instruction). In addition, as an area of 300 DPI of the overwriting-side object, an area in a rightward direction from the dot U is set to "cyan (C):color present (Y)".

FIG. 11C illustrates base-side object data (600 DPI+300 DPI). The base-side object data is the same as the base-side object data as described above, and the description is omitted.

FIG. 11D illustrates the synthetic object data. In a right-half portion of the dot T (dots T3 and T4), colorless dots 80 that have no color information are set. This is because "black (K):no color (N)" in the dots T3 and T4 of the overwriting-side object data is prioritized. In this portion, a void occurs.

In view of this, an adjustment process of setting the dot T of 300 DPI to "cyan (C):color present (Y)" is performed on the overwriting-side object data. FIG. 11E illustrates the overwriting-side object data on which the adjustment process has been performed. FIG. 11F illustrates synthetic object data using the adjusted overwriting-side object data. An area of cyan (C) is extended leftward to the dot T, and this enables preventing the occurrence of a void in the dots T3 and T4. In addition, an amount (increment) that low-resolution data is extended leftward in order to prevent a void may be one dot or more.

In other words, this adjustment process is a process in which "when, in overwriting image data, high-resolution component data corresponding to a high-resolution printing unit makes up a larger portion of a boundary portion between the high-resolution component data and low-resolution component data corresponding to a low-resolution printing unit than does the low-resolution component data, and a void instruction is issued to the larger portion within the boundary portion, the low-resolution component data is made to have a larger portion than the larger portion within the boundary portion, and an overwriting process is performed".

FIG. 12A to FIG. 12D illustrate a process of forming synthetic object data in a case in which the boundaries do not coincide with each other in the third combination (second example). As illustrated in an enlarged view of graphic data of FIG. 12A, a boundary h between images deviates from a boundary between dots by 0.7 p.

Figure 12A:
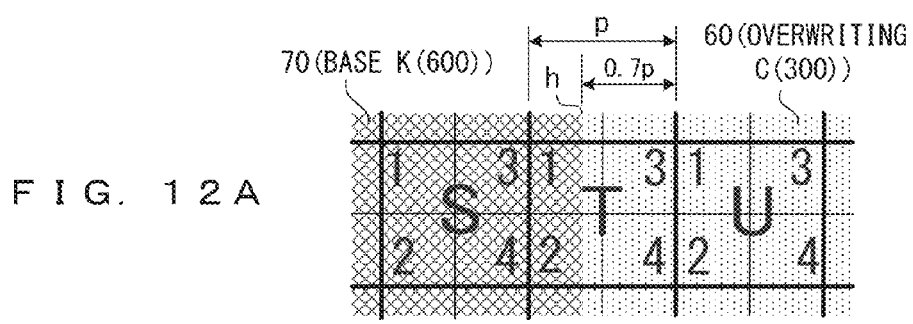
FIG. 12A is an enlarged view of graphic data in a case in which the boundaries do not coincide with each other in the third combination (second example).
Figure 12B:
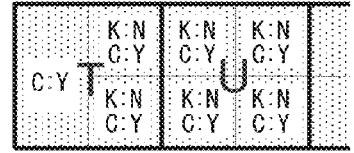
FIG. 12B illustrates overwriting-side object data in a case in which boundaries do not coincide with each other in the third combination (second example).

FIG. 12B illustrates overwriting-side object data (600 DPI+300 DPI). As an area of 600 DPI of the overwriting-side object data, an area in a rightward direction from the dots T3 and T4 is set to "black (K):no color (N)". In addition, as an area of 300 DPI of the overwriting-side object data, an area in a rightward direction from the dot T is set to "cyan (C):color present (Y)".

Figure 12C:
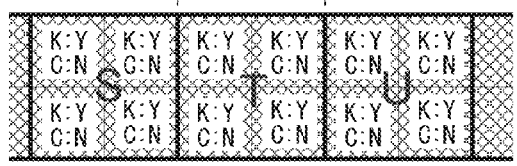
FIG. 12C illustrates base-side object data in a case in which the boundaries do not coincide with each other in the third combination (second example).
Figure 12D:
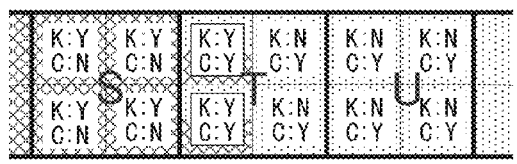
FIG. 12D illustrates synthetic object data in a case in which the boundaries do not coincide with each other in the third combination (second example).

FIG. 12C illustrates base-side object data (600 DPI+300 DPI). The base-side object data is the same as the base-side object data described above. FIG. 12D illustrates synthetic object data. In the second example, no voids occur.

<Fourth Combination>

A fourth combination is a case in which a base image 70 is cyan (C) of a high resolution (600 DPI) and an overwriting image 60 is black (K) of a low resolution (300 DPI). The fourth combination is a combination generated by exchanging colors in the third combination with each other (K↔C). Accordingly, an adjustment process performed in order to prevent a void in the fourth combination is the same as the process in the third combination as described above, and the description is omitted.

<Processing Flow>

Figure 13:
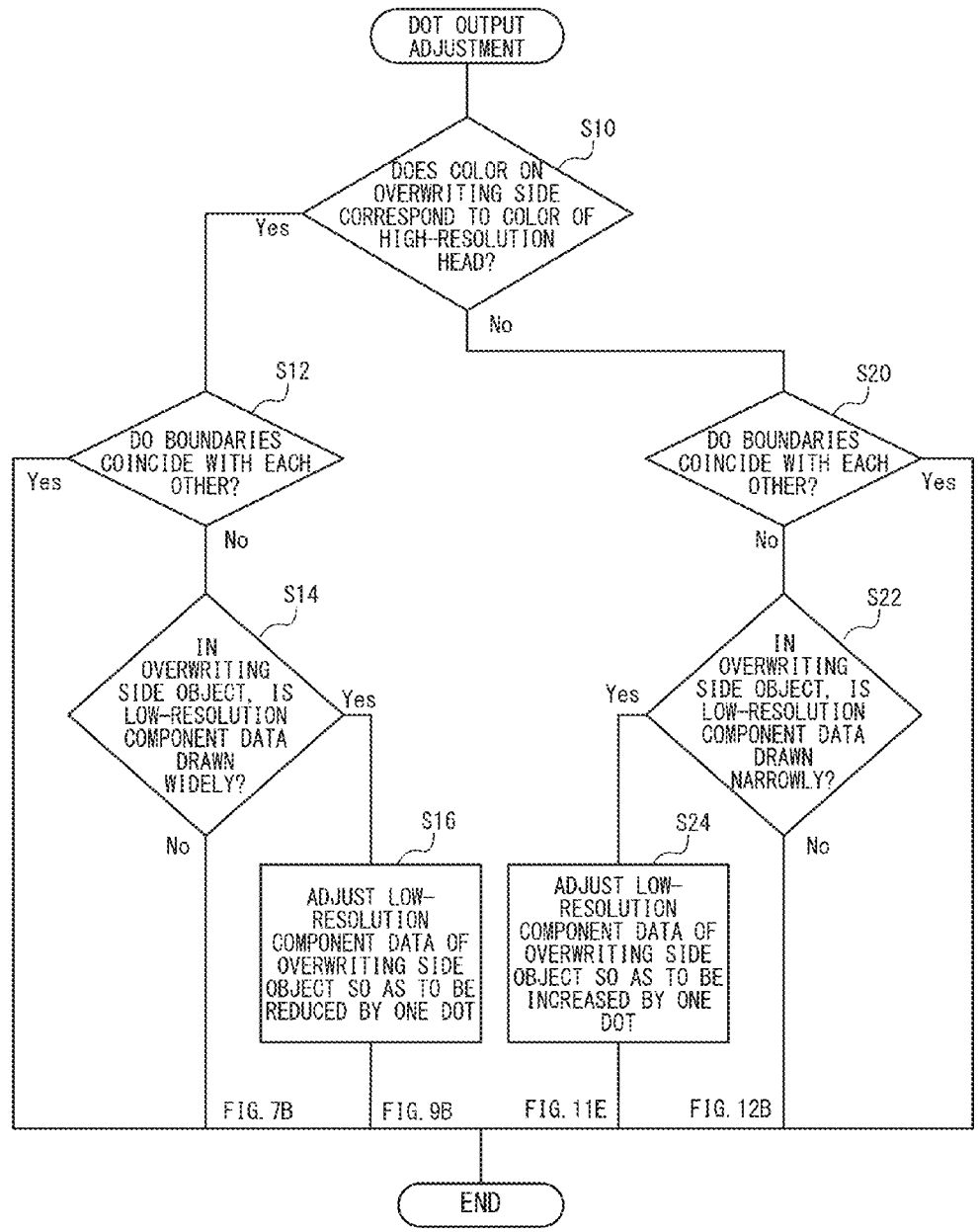
FIG. 13 is a flowchart 1 explaining the procedure of an adjustment process in each of the first to fourth combinations.

FIG. 13 is a flowchart 1 explaining a procedure of an adjustment process in each of the first to fourth combinations. This process is mainly performed by the adjustment processing unit 26 of the image forming unit 20.

It is determined whether a color on an overwriting side corresponds to a color of a high-resolution head (step S10). It is in the first and second combinations as described above that the color of an overwriting-side object corresponds to the color of the high-resolution head. In the first and second combinations, it is determined that the color on the overwriting side has a high resolution (Yes in step S10), and it is determined whether boundaries coincide with each other (step S12).

Namely, it is determined whether a boundary between images (objects) coincides with a boundary between dots (border). When it is determined that the boundaries coincide with each other (Yes in step S12), an adjustment process is not performed at a boundary portion, and the process is finished. This is because, as described above with reference to FIG. 4A to FIG. 6C, when the boundaries coincide with each other, no void portions are generated, and the adjustment process at the boundary portion is not needed.

When it is determined that the boundaries do not coincide with each other (No in step S12), it is determined whether low-resolution component data is drawn widely in the overwriting-side object (step S14). That a low-resolution object is drawn widely means that a drawing of a low-resolution component goes beyond that of a high-resolution component within a boundary portion. Specifically, this is a case as illustrated in b3 of FIG. 8B, in which, in the dots T1 and T2, an area colored in cyan (C) of a low-resolution component is larger than an area colored in black (K) of a high-resolution component.

On the other hand, in a case illustrated in FIG. 7B, it is determined that the low-resolution component data is not drawn widely in the overwriting-side object (No in step S14), the adjustment process is not performed at the boundary portion, and the process is finished. This is because, as described above with reference to FIG. 7D, no void portions are generated in this case, and the adjustment process at the boundary portion is not needed.

In a case as illustrated in b3 of FIG. 8B, it is determined that the low-resolution component data is drawn widely in the overwriting-side object (Yes in step S14), and the low-resolution component data of the overwriting-side object is adjusted so as to be reduced by one dot (step S16). This is the adjustment process as described above with reference to FIG. 9B, and enables preventing the occurrence of a void. After the adjustment process, the process is finished. The low-resolution component data of the overwriting-side object may be adjusted so as to be reduced by one dot or more.

In a case of the third or fourth combination, it is determined that the color on the overwriting side does not have a high resolution (No in step S10), and it is determined whether boundaries coincide with each other (step S20). When it is determined that the boundaries coincide with each other (Yes in step S20), the adjustment process at the boundary portion is not performed, and the process is finished. This is because, as described above with reference with FIG. 10E, when the boundaries coincide with each other, no void portions are generated, and the adjustment process at the boundary portion is not needed.

When it is determined that the boundaries do not coincide with each other (No in step S20), it is determined whether the low-resolution component data is narrowly drawn in the overwriting-side object (step S22). That a low-resolution object is narrowly drawn means that a drawing of a high-resolution component goes beyond that of a low-resolution component within a boundary portion. Specifically, this is a case as illustrated in FIG. 11B, in which, in the dots T3 and T4, an area colored in black (K) of a high-resolution component is larger than an area colored in cyan (C) of a low-resolution component.

In a case as illustrated in FIG. 12B, it is determined that the low-resolution component data is not narrowly drawn in the overwriting-side object (No in step S22), and the process is finished without performing the adjustment process at the boundary portion. This is because, as illustrated in FIG. 12D, no void portions are generated, and the adjustment process at the boundary portion is not needed.

In a case as illustrated in FIG. 11B, it is determined that the low-resolution component data is narrowly drawn in the overwriting-side object (the high-resolution component data is drawn widely) (Yes in step S22), and the low-resolution component data of the overwriting-side object is adjusted so as to be increased by one dot (step S24). This is an adjustment process as illustrated in FIG. 11E, and enables preventing the occurrence of a void. After the adjustment process, the process is finished. An adjustment amount of the low-resolution component data may be more than one dot.

Figure 14:
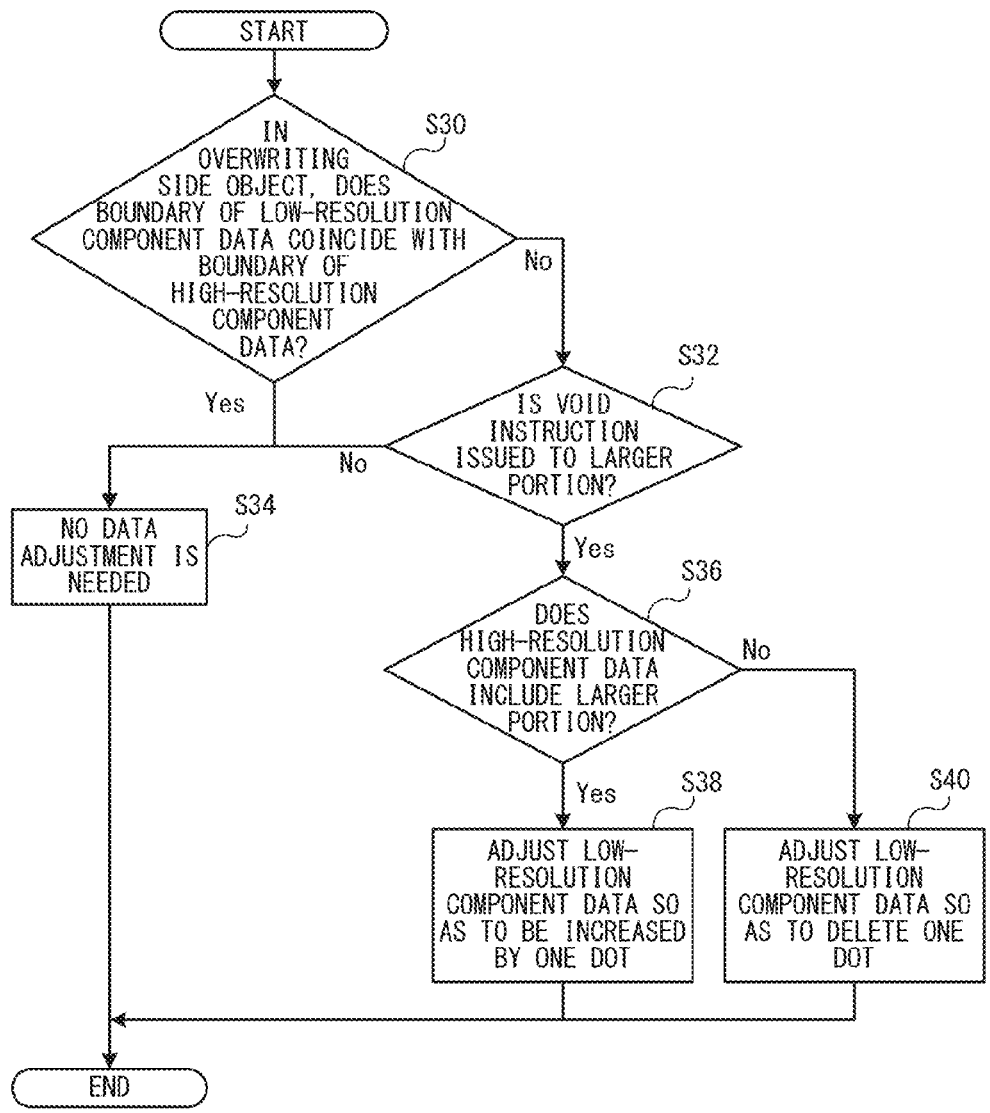
FIG. 14 is a flowchart 2 explaining the procedure of the adjustment process in each of the first to fourth combinations.

FIG. 14 is a flowchart 2 explaining the procedure of the adjustment process in each of the first to fourth combinations. In the flowchart 2, the determinations are expressed differently from the flowchart 1, but a process that is performed is the same as that in the flowchart 1. Similarly to the flowchart 1, the process is mainly performed by the adjustment processing unit 26 of the image forming unit 20.

It is determined whether a boundary of a low-resolution data component coincides with a boundary of a high-resolution data component in the overwriting-side object (step S30).

When it is determined that the low-resolution data component coincides with the high-resolution data component in the overwriting-side object (Yes in step S30), it is determined that a data adjustment is not needed (step S34) and the process is finished. This is because, as described above, when the boundaries coincide with each other, no voids occur.

When it is determined that the boundaries do not coincide with each other (No in step S30), it is determined whether a void instruction is issued to a larger portion at the boundary portion (step S32). When it is determined that the void instruction is not issued to the larger portion (No in step S32), it is determined that the data adjustment is not needed (step S34) and the process is finished. This is a case as described in the first combination (FIG. 7A to FIG. 7D) or the third combination (FIG. 12A to FIG. 12D).

When it is determined that the void instruction is issued to the larger portion (Yes in step S32), it is determined whether the high-resolution component data includes the larger portion (step S36). When it is determined that the high-resolution component data includes the larger portion (Yes in step S36), the low-resolution component data is adjusted so as to be increased by one dot (step S38). This is a case as illustrated in FIG. 11E in the third combination. When it is determined that the high-resolution component data does not include the larger portion (No in step S36), the low-resolution component data is adjusted so as to delete one dot (step S40). This is a case as illustrated in FIG. 9B in the first combination. The description of the flowchart 2 is concluded.

In the embodiments above, the combination of black (K) and cyan (C) has been given for a print head, but this is an example, and other colors (yellow or magenta) may be used as a matter of course. In addition, an ink-jet system is represented as a printer printing system, but the printing system may be an electrostatic system or a thermal system. Further, "300 DPI+600 DPI" is taken as an example of resolutions, but another combination may be used.

In addition, the adjustment processing unit 26 has been described as an example of an application of the PC 1. However, the adjustment processing unit 26 may be incorporated into the printer 10, or may be one of the functions of a printer driver stored in the PC 1. Further, the adjustment processing unit 26 has been described as software realized by the CPU 2, but a portion or the entirety of the adjustment processing unit 26 may be configured of hardware.

The present invention is not limited to the embodiments described above as they are, but components can be varied and embodied without departing from the spirit of the embodiments. In addition, various inventions may be made by appropriately combining a plurality of components disclosed in the embodiments above. For example, all of the components described in the embodiments may be combined. Further, components in different embodiments may be combined appropriately. Such various modifications or applications can be made without departing from the spirit of the present invention as a matter of course.

EXPLANATION OF REFERENCE NUMERALS

1 PC
2 CPU
4 Memory
6 Input/output IF
10 Printer
20 Image forming unit
22 Color converting unit
24 Rasterization processing unit
26 Adjustment processing unit
50 Original image
60 Overwriting image
70 Base image
80 Void portion

What is claimed is:

1. An image-forming apparatus that generates print image data for a printing apparatus in which a printing unit is provided for each color, and on which, as the printing unit, at least a low-resolution printing unit having a relatively low resolution and a high-resolution printing unit having a relatively high resolution are mounted, the image-forming apparatus comprising:

a color conversion processing unit that converts colors of an original image into color data for the printing apparatus;

a rasterizing unit that generates data relating to a shape corresponding to a resolution of the printing unit from the original image; and an adjustment processing unit that generates overwriting image data relating to an overwriting-side object by synthesizing the color data generated by the color conversion processing unit and the data relating to the shape generated by the rasterizing unit, and generates the print image data by performing an overwriting process of overwriting base image data with the overwriting image data, wherein, when, in the overwriting image data, low-resolution component data corresponding to the low-resolution printing unit makes up a larger portion of a boundary portion between the low-resolution component data and high-resolution component data corresponding to a high-resolution printing unit than does the high-resolution component data, and a void instruction is issued to the larger portion within the boundary portion, the adjustment processing unit deletes the low-resolution component data corresponding to the larger portion within the boundary portion, and performs the overwriting process.

2. An image-forming apparatus that generates print image data for a printing apparatus in which a printing unit is provided for each color, and on which, as the printing unit, at least a low-resolution printing unit having a relatively low resolution and a high-resolution printing unit having a relatively high resolution are mounted, the image-forming apparatus comprising:

a color conversion processing unit that converts colors of an original image into color data for the printing apparatus;

a rasterizing unit that generates data relating to a shape corresponding to a resolution of the printing unit from the original image; and an adjustment processing unit that generates overwriting image data relating to an overwriting-side object by synthesizing the color data generated by the color conversion processing unit and the data relating to the shape generated by the rasterizing unit, and generates the print image data by performing an overwriting process of overwriting base image data with the overwriting image data, wherein, when, in the overwriting image data, high-resolution component data corresponding to the high-resolution printing unit makes up a larger portion of a boundary portion between the high-resolution component data and low-resolution component data corresponding to a low-resolution printing unit than does the low-resolution component data, and a void instruction is issued to the larger portion within the boundary portion, the adjustment processing unit makes the low-resolution component data have a larger portion than the larger portion within the boundary portion, and performs the overwriting process.

* * * * *